June 13, 1939.  A. LENNING  2,161,875
REFRIGERATION
Filed Jan. 19, 1937
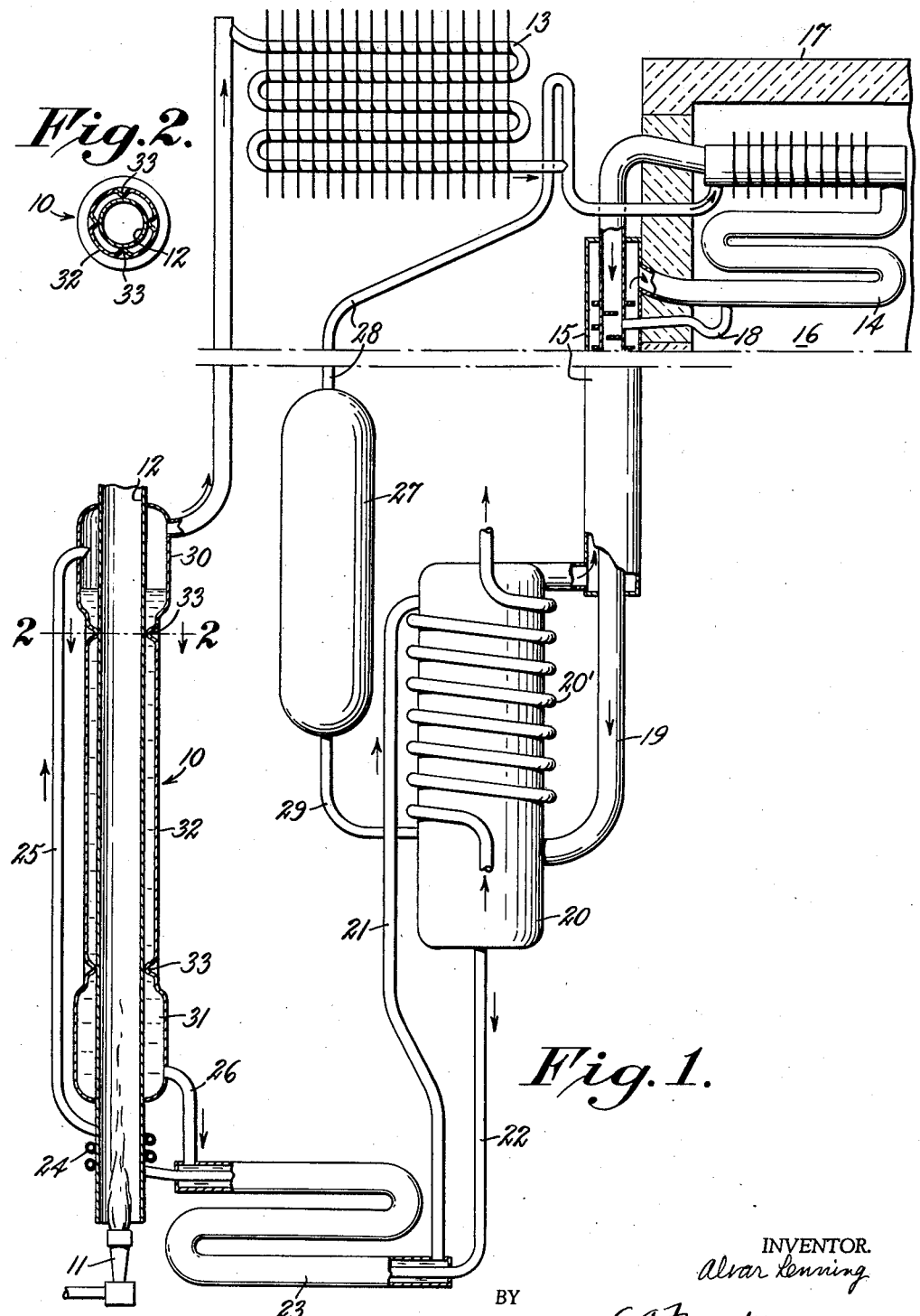
INVENTOR.
Alvar Lenning
BY
EA Evander
his ATTORNEY.

Patented June 13, 1939

2,161,875

UNITED STATES PATENT OFFICE 2,161,875

REFRIGERATION

Alvar Lenning, Stockholm, Sweden, assignor, by mesne assignments, to Servel, Inc., New York, N. Y., a corporation of Delaware Application January 19, 1937, Serial No. 121,254
In Germany February 7, 1936

8 Claims. (Cl. 62—119.5)

My invention relates to refrigeration, and more particularly to refrigeration apparatus in which vapor is expelled out of solution in a boiler or generator.

In expelling refrigerant vapor out of absorption liquid by the application of heat to a generator or boiler, it is desirable that a minimum quantity of vapor of absorption liquid accompany the refrigerant vapor because the vaporization of absorption liquid and subsequent condensation thereof in other parts of the apparatus represents a heat loss. To maintain at a minimum the quantity of absorption liquid leaving the generator, it is particularly desirable to insure a gradient concentration of absorption solution between the region into which relatively strong solution is introduced and the region from which relatively weak solution is withdrawn. A gradient concentration of absorption solution may be effected by restraining turbulence and convection of liquid in the generator.

It is an object of my invention to provide an improved generator or boiler for absorption refrigeration apparatus which will effectively damper turbulence and convection of absorption solution and insure the expulsion of refrigerant vapor containing a minimum quantity of vapor of the absorption liquid. I accomplish this by providing a generator having spaced wall members to retain a solution of absorption liquid and refrigerant, the wall members being arranged relatively close to each other for a substantial distance to provide a narrow and unobstructed space which will present a relatively great resistance to local movements of liquid intermediate the regions into which strong solution is introduced and from which weak solution is withdrawn, so that a steep gradient in concentration of solution is produced between the regions containing the strong and weak solutions.

The above and other objects and advantages of my invention will become apparent from the following descrpition taken in connection with the accompanying drawing forming a part of this specification, and of which Fig. 1 diagrammatically illustrates absorption refrigeration apparatus provided with a generator embodying my invention; and Fig. 2 is a sectional view taken on line 2—2 of Fig. 1.

Referring to the drawing, I have shown my invention embodied in a type of absorption refrigeration apparatus generally like that described in Patent 1,609,334 to von Platen and Munters. It is to be understood, however, that my invention can be employed with other types of absorption refrigeration apparatus.

The refrigeration apparatus includes a generator 10 containing a refrigerant, such as ammonia, in solution in a body of absorption liquid, such as water. The generator 10 is heated by a gas burner 11 which projects its flame into the lower end of a flue 12. The heat applied to the generator 10 and its contents expels ammonia vapor out of solution. The ammonia vapor flows upward to an air-cooled condenser 13 in which it is liquefied. The liquefied ammonia flows from the air-cooled condenser 13 into the upper end of an evaporator 14. An auxiliary agent or inert gas, such as hydrogen, enters the lower end of the evaporator from the outer passage of a gas heat exchanger 15.

The liquid ammonia evaporates and diffuses into the hydrogen with consequent absorption of heat from the surroundings of the evaporator 14 which, as shown in Fig. 1, may be disposed in a thermally insulated storage compartment 16 of a refrigerator cabinet 17. A conduit 18 is provided to drain liquid ammonia from the lower end of the evaporator 14 into the inner passage of the gas heat exchanger 15.

The resulting rich gas mixture of ammonia and hydrogen flows from the upper end of the evaporator 14 through the inner passage of the gas heat exchanger 15 and conduit 19 into the lower end of an absorber 20. The ammonia is absorbed out of the enriched gas mixture into weak absorption liquid which enters the upper part of the absorber 20 from a conduit 21. The hydrogen, which is practically insoluble and weak in ammonia, passes upwardly from the absorber 20 through the outer passage of the gas heat exchanger 15 and into the lower end of the evaporator 14.

The absorption liquid in the absorber 20 becomes enriched in ammonia and flows through conduit 22 and the inner passage of a liquid heat exchanger 23 to a coil 24 which is disposed about the lower end of the flue 12. The enriched absorption liquid is heated in the coil 24 and raised by vapor-lift action through conduit 25 into the upper part of the generator 10. The absorption liquid weak in ammonia flows from the lower part of the generator through conduit 26, the outer passage of the liquid heat exchanger 23, and conduit 21 into the upper end of the absorber 20. The latter is provided with a coil 20' through which a suitable cooling medium is circulated.

A vessel 27 is connected by conduit 28 to the lower end of the condenser 13 and by a conduit 29 to the gas circuit, as at the absorber 20, for example, so that any hydrogen which may pass through the condenser can flow to the gas circuit and not be trapped in the condenser. If ammonia is not liquefied in the condenser 13 due to an increase of air temperature, the ammonia vapor will flow into the vessel 27 and force hydrogen into the gas circuit, thereby raising the total pressure in the system so that an adequate condensing pressure is obtained for the increased air temperature.

In accordance with my invention the generator 10 is so constructed and arranged that a steep gradient in concentration of solution is maintained between the upper end 30 into which enriched absorption solution is introduced through the conduit 25, and the lower end 31 from which weak absorption solution is withdrawn and conducted through conduit 26 to the absorber 20. I accomplish this by arranging the tubular flue 12 and cylindrical jacket 32 closely adjacent to each other for a substantial distance lengthwise of the generator, the distance between the spaced wall members formed by the flue 12 and jacket 32 preferably being between 1.5 to 3 mm.

In order to facilitate the centering of the flue 12 within the jacket 32 the latter may be provided with a plurality of indentations 33, as shown most clearly in Fig. 2. If desired, similar indentations or projections may be formed on the flue 12 so that the narrow space between the flue and the jacket will be substantially uniform about the generator 10. The upper and lower ends 30 and 31 of the jacket 32 are preferably enlarged to maintain a greater quantity of enriched and weak absorption solution at the regions from which refrigerant vapor is expelled and from which weak solution is withdrawn.

In operation, enriched liquid solution enters the upper end 30 of the generator from the conduit 25 by vapor-lift action due to heating of the coil 24. The enriched absorption solution descends in the generator 10 and during such downward movement becomes progressively hotter and also progressively weaker due to the expulsion of refrigerant vapor therefrom. The bubbles of refrigerant vapor formed in the column of liquid solution rise and pass out of solution at the region where the concentration of absorption solution is strongest.

By making the downward path of flow of absorption solution relatively narrow intermediate the upper and lower ends of the generator, turbulence and convection of liquid solution are effectively dampened. The relatively long length of the annular narrow space has the advantage that the upper end 30 remains relatively cool. Also, the cross-sectional area of the annular space formed between the upper and lower ends 30 and 31 is relatively great compared to the narrow width of the space between the flue 12 and jacket 32. Thus, the vapor of absorption liquid contained in the ascending bubbles of ammonia vapor, particularly the bubbles of ammonia vapor formed in the lower or hotter parts of the generator, is effectively condensed as it passes through the cooler strata of absorption liquid at the upper end of the generator 10. Since the concentration of absorption liquid is strongest at the upper end of the generator, the latent heat of condensation of the absorption liquid provides additional heat for generating ammonia vapor so that substantially pure ammonia vapor is expelled out of solution. Since heat is applied to the lower end of the generator 10 this region will be the hottest with the result that the weakest absorption solution is withdrawn through the conduit 26 and conducted to the absorber 20.

Although I have shown and described one embodiment of my invention, it will be apparent to those skilled in the art that modifications may be made without departing from the spirit and scope of the invention, as pointed out in the following claims.

What is claimed is:

1. In an absorption refrigeration apparatus, a vertical cylindrical generator for containing a solution of absorption liquid and refrigerant, a tubular heating flue extending upwardly through said generator and forming a substantially annular space for said solution, means for introducing strong solution at the upper end of said generator, and means for withdrawing weak solution from the lower end of said generator, said generator and said flue being so constructed and arranged that the annular space intermediate the ends of said generator is relatively narrow and smaller than the annular spaces at the upper and lower ends of said generator.

2. In an absorption refrigeration apparatus, an absorber, a vessel adapted to hold a vertical column of solution of absorption liquid and refrigerant, means for conducting strong absorption liquid from said absorber to the upper part of said column, means for conducting liquid from the lower part of said column to said absorber, and means to heat the lower part of said column to cause vapor to be evolved and flow upwardly therein, said vessel being constructed and arranged to provide a substantially unobstructed space at a place intermediate said upper and lower parts which extends for a substantial distance lengthwise of said column and is sufficiently narrow to effectively dampen convection and turbulence of the liquid and thereby maintain a steep gradient in concentration of solution between said upper and lower parts of said column.

3. In an absorption refrigeration apparatus, a generator comprising a vessel forming a vertically extending annular space for containing a solution of absorption liquid and refrigerant, means for introducing strong solution to the upper part of said generator, means for withdrawing weak solution from the lower part of said generator, and means for heating said generator, said annular space being larger at the upper and lower ends than at the region intermediate said ends and the intermediate region being sufficiently narrow for a substantial vertical distance to effect a relatively great dampening of convection and turbulence of the liquid and thereby maintain a steep gradient in concentration of solution between said upper and lower parts of the generator.

4. That improvement in the art of refrigeration which comprises maintaining an upright column of a solution of absorption liquid and refrigerant, introducing a strong solution to the upper part of said column, withdrawing weak solution from the lower part of said column, applying heat to the lower part of said column to evolve gaseous refrigerant from solution, and limiting vertical movement of said solution at a place between said upper and lower parts which is of adequate length along the column and sufficiently narrow to effect a relatively great dampening of convection and turbulence of the liquid to maintain a steep gradient in concentration of solution between said upper and lower parts while causing vapor to flow in a direction counter-current to the liquid in the column.

5. An absorption refrigeration system having a place of heating for causing expulsion of refrigerant vapor from absorption liquid, means for conducting absorption liquid to and from said place of heating, and means for conducting expelled vapor from said place of heating, said place of heating having a long narrow liquid containing space substantially 3 millimeters or less in width, and said conducting means being arranged so that absorption liquid enters and leaves the place of heating at opposite ends of said space and vapor leaves at the end of said space at which absorption liquid enters.

6. An absorption refrigeration system as set forth in claim 5 in which said long narrow space is annular in cross-sectional area.

7. An absorption refrigeration system as set forth in claim 5 in which said long narrow space is substantially vertical and said conduit means are arranged so that absorption liquid enters and expelled vapors leave at the upper end of said space.

8. A refrigeration system as set forth in claim 5 in which said space has portions of greater width at each end where liquid enters and leaves.

ALVAR LENNING.